US012590008B2

(12) United States Patent
Welham

(10) Patent No.: US 12,590,008 B2
(45) Date of Patent: Mar. 31, 2026

(54) PROCESS FOR PRODUCING HIGH PURITY ALUMINUM MATERIALS

(71) Applicant: HiPurA Pty Ltd, East Perth (AU)

(72) Inventor: Nicholas James Welham, Perth (AU)

(73) Assignee: HiurA Pty Ltd, East Perth (AU)

( * ) Notice: Subject to any disclaimer, the term of this patent is extended or adjusted under 35 U.S.C. 154(b) by 0 days.

(21) Appl. No.: 18/567,290

(22) PCT Filed: Jul. 5, 2022

(86) PCT No.: PCT/AU2022/050698
§ 371 (c)(1),
(2) Date: Dec. 5, 2023

(87) PCT Pub. No.: WO2023/279151
PCT Pub. Date: Jan. 12, 2023

(65) Prior Publication Data
US 2024/0327233 A1 Oct. 3, 2024

(30) Foreign Application Priority Data

Jul. 5, 2021 (AU) ................................. 2021902044

(51) Int. Cl.
| | |
|---|---|
| C01F 7/20 | (2006.01) |
| B01D 9/00 | (2006.01) |
| B01D 11/04 | (2006.01) |
| B01D 15/36 | (2006.01) |
| B01J 39/05 | (2017.01) |
| B01J 39/07 | (2017.01) |

(52) U.S. Cl.
CPC .............. C01F 7/20 (2013.01); B01D 9/0018 (2013.01); B01D 11/0492 (2013.01);
(Continued)

(58) Field of Classification Search
None
See application file for complete search history.

(56) References Cited

U.S. PATENT DOCUMENTS 4,634,581 A * 1/1987 Cambridge ............. C01F 7/306
423/132
9,382,600 B2 7/2016 Boudreault et al.
(Continued)

FOREIGN PATENT DOCUMENTS

| WO | WO 2008/141423 A1 | 11/2008 |
|---|---|---|
| WO | WO 2012/065253 A1 | 5/2012 |
| WO | WO 2021/097518 A1 | 5/2021 |

OTHER PUBLICATIONS

International Search Report and Written Opinion of the International Search Authority issued by the Australian Patent Office for International Patent Application No. PCT/AU2022/050698 dated Aug. 31, 2022. (8 pages).

(Continued)

*Primary Examiner* — Stefanie J Cohen
(74) *Attorney, Agent, or Firm* — Haynes and Boone, LLP

(57) ABSTRACT

A process for producing high purity alumina (HPA) or high purity aluminium salts from an aluminium-bearing material, such as is disclosed. An aluminium-bearing solution is first obtained by either dissolving or leaching the aluminium-bearing material. Aluminium is then selectively extracted by liquid-liquid or liquid-solid extraction to obtain an aluminium-enriched liquid or aluminium-enriched solid phase. Minor metal impurities still remaining in the aluminium-enriched liquid or solid phase are removed by scrubbing the aluminium-enriched liquid or aluminium-loaded ion exchange resin with an aqueous solution thereby producing a metal impurity-depleted aluminium-enriched liquid or metal impurity-depleted aluminium enriched solid phase. Aluminium is then stripped from the scrubbed liquid or solid phases with an acidic aqueous solution to produce an aluminium-enriched aqueous solution. High purity aluminium salts may be crystallised from said solution. Alter-
(Continued)

natively, the pH of said solution may be raised to precipitate an aluminium precipitate, such as Al(OH)3, which is then calcined to produce HPA.

25 Claims, 3 Drawing Sheets

(52) U.S. Cl.
CPC ............ *B01D 15/362* (2013.01); *B01J 39/05* (2017.01); *B01J 39/07* (2017.01); *C01P 2006/80* (2013.01)

(56) References Cited

U.S. PATENT DOCUMENTS

| | | | |
|---|---|---|---|
| 2010/0150799 A1* | 6/2010 | Boudreault | C22B 3/22 423/112 |
| 2014/0301919 A1 | 10/2014 | Lakshmanan et al. | |

OTHER PUBLICATIONS

International Preliminary Report on Patentability of the International Preliminary Examining Authority issued by the Australian Patent Office for International Patent Application No. PCT/AU2022/050698 dated May 22, 2023. (19 pages).

Extended European Search Report issued by the European Patent Office for European Patent Application No. 22836392.5 dated Jul. 9, 2025. (14 pgs.).

Second Examination Report issued by the Canadian Patent Office for Canadian Patent Application No. 3,220,775 dated Sep. 22, 2025. (9 pgs.).

El-Nadi, Y.A., "Solvent Extraction and Its Applications on Ore Processing and Recovery of Metals: Classical Approach" Separation and Purification Reviews, 2017, vol. 46, No. 3, pp. 195-215. (21 pgs.).

Mohapatra et al., "Liquid-liquid extraction of aluminium(III) from mixed sulphate solutions using sodium salts of Cyanex 272 and D2EHPA" Separation and Purification Technology, 2017, vol. 56, No. 3, pp. 311-318. (8 pgs.).

* cited by examiner

PROCESS FOR PRODUCING HIGH PURITY ALUMINUM MATERIALS

CROSS-REFERENCE TO RELATED APPLICATIONS

The present application is a U.S. National Stage patent application of International Patent Application No. PCT/AU2022/050698, filed Jul. 5, 2022, which claims the benefit of Australian Patent Application No. 2021902044, filed Jul. 5, 2021, the benefit of which is claimed and the disclosures of which are incorporated herein by reference in their entirety.

TECHNICAL FIELD

The present disclosure relates to a process for producing high purity aluminium compounds, in particular high purity alumina (HPA) and high purity aluminium salts.

BACKGROUND

The following discussion of the background to the invention is intended to facilitate an understanding of the invention. However, it should be appreciated that the discussion is not an acknowledgement or admission that any of the material referred to was published, known or part of the common general knowledge as at the priority date of the application.

The US Bureau of Mines (USBM) process for producing high purity alumina from aluminous clays has been known since the 1940's. The process consists of a large number of stages which can be summarised as beneficiation, calcination to produce metakaolin, leaching in HCl, two or more stages of sequential precipitation and redissolution, accompanied by HCl sparging, and finally calcination to alumina.

Several variations of the USBM process have been published. For example, U.S. Pat. No. 9,382,600 describes leaching an aluminium-containing material with hydrochloric acid to obtain a leachate, and then reacting the leachate with HCl gas to precipitate aluminium chloride. The aluminium chloride precipitate is separated and then converted to alumina by calcination. The gaseous hydrogen chloride generated during calcination is recycled for use as the lixiviant in the leaching step.

This process has a large number of unit operations which result in considerable capital and operating costs. In particular, the necessity to recycle dry hydrogen chloride gas adds considerably to the cost of the process by way of power, materials of construction and installation of gas capture during the final calcination.

Many aluminium-bearing materials, such as aluminous ores, contain significant metal impurities such as Fe, K, Mg, Na, Ca, Mn, Ba, Zn, Li, Sr, V, Ni, Cr, Pb, Cu, Co, Sb, As, B, Sn, Be, Mo or mixtures thereof. The production of high purity aluminium compounds from such materials is necessarily complicated by multiple purification steps to sequentially remove metal impurities from aluminium-bearing leachates. Such purification steps may include step-wise precipitation of metal impurities as metal hydroxides by addition of base followed by separation of the metal impurity-depleted aluminium containing liquor and/or sequential crystallisation, redissolution and recrystallisation to further deplete the aluminium-containing compound of metal impurities.

International Publication No. WO2008/141423 describes a process for extracting aluminium from argillite, an iron-bearing aluminous ore. Argillite is first roasted at a temperature greater than 550° C. for a period of about 1 to 2 hours. The pre-treated argillite is then leached with concentrated hydrochloric acid at temperatures close to boiling point of the slurry. Iron is subsequently removed from the resulting leachate by increasing the pH to at least 10 by adding NaOH or KOH to precipitate iron and other metals, with the exception of alkaline metals such as Na or K which remain in solution. Aluminium may be extracted from the iron-depleted solution by means of solvent extraction with Cyanex 272 whereby pH adjustment is performed by a regulation loop controlling the NaOH addition. Complexed aluminium is then recovered by a back extraction with hydrochloric acid. Although the recovered aluminium enriched raffinate is free of iron, the composition of Ca, Mg, Na and K is >7%. Further purification to exceed 92.81% is achieved after precipitation of $Al(OH)_3$ aluminium hydroxide and subsequent recrystallisation steps, but it is not evident that the process produces the current market requirements for 99.99% purity.

The process as described herein seeks to alleviate some of the aforementioned problems.

SUMMARY

The present disclosure provides a process for producing high purity alumina (HPA) and/or high purity aluminium salts from soluble aluminium-bearing materials.

One aspect of the disclosure provides a process for producing high purity alumina (HPA) from an aluminium-bearing material, the process comprising the steps of:

providing an aluminium-bearing solution of the aluminium-bearing material, selectively extracting aluminium from the aluminium-bearing solution by liquid-liquid extraction or liquid-solid extraction to obtain an aluminium-enriched liquid or aluminium-loaded ion exchange resin;

scrubbing the aluminium-enriched liquid or aluminium-loaded ion exchange resin with an aqueous solution to remove metal impurities therefrom, thereby producing a metal impurity-depleted aluminium-enriched liquid or metal impurity-depleted aluminium enriched solid phase;

stripping aluminium from the metal impurity-depleted aluminium-enriched liquid or metal impurity-depleted aluminium-enriched solid phase by contacting said liquid or said solid phase with an acidic aqueous solution to produce an aluminium-enriched aqueous solution;

precipitating and separating an aluminium precipitate from the aluminium-enriched aqueous solution; and, calcining the separated aluminium precipitate to produce HPA.

Another aspect of the disclosure provides a process for producing high purity aluminium salts from an aluminium-bearing material, the process comprising the steps of:

providing an aluminium-bearing solution of the aluminium-bearing material, selectively extracting aluminium from the aluminium-bearing solution by liquid-liquid extraction or liquid-solid extraction to obtain an aluminium-enriched liquid or aluminium-enriched solid phase;

scrubbing the aluminium-enriched liquid or aluminium-loaded ion exchange resin with an aqueous solution to remove metal impurities therefrom, thereby producing a metal impurity-depleted aluminium-enriched liquid or metal impurity-depleted aluminium enriched solid phase;

stripping aluminium from the metal impurity-depleted aluminium-enriched liquid or metal impurity-depleted aluminium-enriched solid phase by contacting said liquid or said phase with an acidic aqueous solution to produce an aluminium-enriched aqueous solution; and, crystallising and separating a high purity aluminium salt from the aluminium-enriched aqueous solution.

In one embodiment, the step of providing an aluminium-bearing solution of the aluminium-bearing material may comprise leaching the aluminium-bearing material in an acid and separating the resulting aluminium-bearing solution from remaining insoluble material.

In another embodiment, the step of providing an aluminium-bearing solution of the aluminium-bearing material may comprise dissolving the aluminium-bearing material in water and separating the resulting aluminium-bearing solution from remaining insoluble material.

In one embodiment, the step of selectively extracting aluminium from the aluminium-bearing solution by liquid-liquid extraction comprises reacting the aluminium-bearing solution with an extractant having selectivity for aluminium ('aluminium extractant').

The aluminium extractant may comprise one or more organophosphorus compounds, in particular an organic derivative of phosphoric acid, an organic derivative of phosphonic acid, an organic derivative of phosphinic acid or an organic derivative of dithiophosphinic acid, optionally in combination with a carboxylic acid, ketoxime or aldoxime compound. The aluminium extractant may be present in an organic liquid phase which is immiscible with the aluminium-bearing solution whereby reacting the aluminium extractant with the aluminium-bearing solution transfers aluminium from the aluminium-bearing solution into the organic liquid phase to produce the aluminium-enriched liquid.

In one embodiment, the step of selectively extracting aluminium from the aluminium-bearing solution by liquid-solid extraction comprises contacting the aluminium-bearing solution with an ion exchange resin having selectivity for aluminium over monovalent or divalent cations. The ion exchange resin may comprise a strong acid cation resin or a weak acid cation resin.

In one embodiment, scrubbing the aluminium-enriched organic liquid comprises contacting the aluminium-enriched organic liquid with an aqueous scrub solution to transfer the minor metal impurities into the aqueous scrub solution, thereby producing an impurity-depleted aluminium-enriched organic liquid phase and an impurity-enriched aqueous phase.

The aqueous scrub solution may be a dilute acid or an aqueous solution of aluminium that is substantially free of the impurities. In this regard, the aqueous scrub solution may comprise a bleed stream of an aluminium-enriched aqueous solution obtained by stripping the aluminium-loaded organic liquid phase In one embodiment, the step of stripping the metal impurity-depleted aluminium-enriched liquid or metal impurity-depleted aluminium-enriched solid phase comprises contacting said liquid or solid phase with an acidic aqueous solution with a pH less than or equal to 3.

In one embodiment, the step of crystallising a high purity aluminium salt from the aluminium-enriched solution comprises evaporating sufficient solvent from the aluminium-enriched solution to exceed a solubility product of the high purity aluminium salt.

In one embodiment, the step of precipitating an aluminium precipitate from the aluminium-enriched solution comprises increasing a pH of said solution to a range of 4-11. Increasing the pH of said solution may be achieved by adding a base to said solution, in particular by adding aqueous ammonia, $NH_4OH$.

In one embodiment, the aluminium precipitate comprises an aluminium oxyhydroxide, $AlOOH$ compound.

In one embodiment, the aluminium precipitate comprises an aluminium hydroxide, $Al(OH)_3$ compound.

In one embodiment, the precipitating step may be performed at an elevated temperature and, optionally, at elevated pressure. In another embodiment, the precipitating step may be maintained at the elevated temperature and, optionally, at the elevated pressure, for between 15 minutes and 48 hours.

The step of calcining the aluminium precipitate may be performed at a temperature between 300° C. and 1400° C. In particular, the step of calcining may be performed in two stages, the first stage being at a first temperature and for a period of time sufficient to eliminate water of crystallisation from the aluminium precipitate and the second stage being at a higher temperature than the first temperature and for a period of time sufficient to convert the aluminium precipitate to corundum ($\alpha$-$Al_2O_3$), $\beta$-alumina or other alumina polymorphs.

In some embodiments of the disclosure, the aluminium-bearing solution may comprise one or more metal impurities, in particular iron. In these particular embodiments, the process may further comprise separating one or more metal impurities from the aluminium-bearing solution prior to selectively extracting aluminium from the aluminium-bearing solution.

In one example, said further step of separating one or more metal impurities from the aluminium-bearing solution comprises selectively extracting the one or more metal impurities by liquid-liquid extraction or liquid-solid extraction to obtain an aluminium-bearing solution depleted in the one or more metal impurities.

In one embodiment, the step of selectively extracting the one or more metal impurities from the aluminium-bearing solution by liquid-liquid extraction comprises reacting the aluminium-bearing solution with an extractant having selectivity for the one or more metal impurities, in particular iron ('iron extractant'). The iron extractant may comprise a mixture of di(2-ethylhexyl) phosphoric acid and tributyl phosphate, or tributyl phosphate, or trioctyl phosphine oxide or an alkyl amine in a free base form.

The iron extractant may be present in an organic liquid phase which is immiscible with the aluminium-bearing solution whereby reacting the iron extractant with the aluminium-bearing solution transfers the one or more metal impurities from the aluminium-bearing solution into the organic liquid phase.

In an alternative embodiment, the step of selectively extracting the one or more metal impurities from the aluminium-bearing solution by liquid-solid extraction comprises contacting the aluminium-bearing solution with an ion exchange resin having selectivity for the one or more metal impurities, in particular iron.

BRIEF DESCRIPTION OF DRAWINGS

Preferred embodiments will now be further described and illustrated, by way of example only, with reference to the accompanying drawings in which.

DESCRIPTION OF EMBODIMENTS

Figure 1:
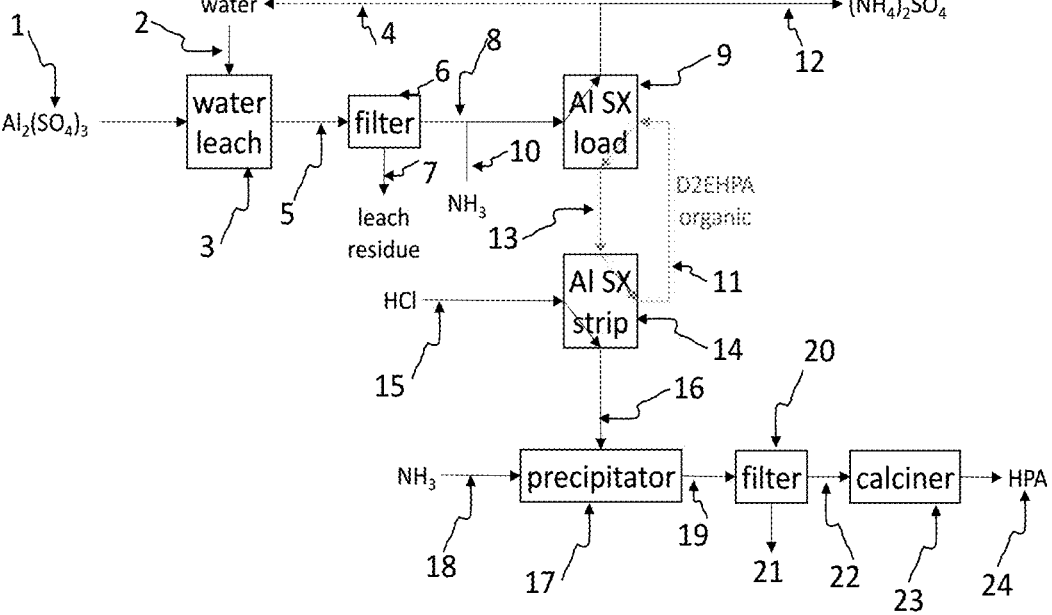
FIG. 1 is a schematic representation of one embodiment of a process for producing high purity alumina (HPA) from soluble aluminium-bearing materials as disclosed herein.

The present disclosure relates to a process for producing high purity alumina (HPA) and/or high purity aluminium salts from soluble aluminium-bearing materials.

General Terms

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or groups of compositions of matter. Thus, as used herein, the singular forms "a", "an" and "the" include plural aspects unless the context clearly dictates otherwise. For example, reference to "a" includes a single as well as two or more; reference to "an" includes a single as well as two or more; reference to "the" includes a single as well as two or more and so forth.

Each example of the present disclosure described herein is to be applied mutatis mutandis to each and every other example unless specifically stated otherwise. The present disclosure is not to be limited in scope by the specific examples described herein, which are intended for the purpose of exemplification only. Functionally-equivalent products, compositions and methods are clearly within the scope of the disclosure as described herein.

The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Reference to positional descriptions, such as lower and upper, are to be taken in context of the embodiments depicted in the figures, and are not to be taken as limiting the invention to the literal interpretation of the term but rather as would be understood by the skilled addressee.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

The term "about" as used herein means within 5%, and more preferably within 1%, of a given value or range. For example, "about 3.7%" means from 3.5 to 3.9%, preferably from 3.66 to 3.74%. When the term "about" is associated with a range of values, e.g., "about X % to Y %", the term "about" is intended to modify both the lower (X) and upper (Y) values of the recited range. For example, "about 20% to 40%" is equivalent to "about 20% to about 40%".

Specific Terms

The term "high purity alumina" as used herein refers to alumina ($\alpha$-$Al_2O_3$, $\beta$-$Al_2O_3$ or other crystalline polymorphs thereof having a purity of 99.99% or higher.

The term "liquid-liquid extraction", also known as solvent extraction, is used to refer to a method to separate chemical compounds or metal complexes, based on their relative solubilities in two different immiscible liquid phases, usually water (polar) and an organic liquid (non-polar). Typically, the two phases are agitated to increase the surface area of the interface between them so as to aid transfer of the chemical compound or metal complex from the polar phase to the non-polar phase. The extent to which a substance may be transferred from the polar phase to the non-polar phase is referred to as the distribution ratio ($K_d$) and is equal to the concentration of the substance in the non-polar phase divided by the concentration of the substance in the polar phase. The distribution ratio may vary according to any one or more of several factors including, but not limited to, temperature, pH, the nature of the polar and non-polar phases, the total concentration of chemical species in the phases, the presence of other chemical species in the phases and so forth.

In some particular liquid-liquid extraction systems, an extractant may be used to increase the distribution ratio of a substance in the organic phase. The term "extractant" as used herein refers to a chemical compound capable of reacting with or binding to a substance in a manner which increases the substance's distribution ratio. With respect to metal ions, in particular divalent and trivalent metal cations, the extractant may be an organic compound which reacts with said metal cation to form a metal complex having a higher distribution ratio than the metal ion, thereby aiding the extraction of the metal ion into the non-polar phase. It will be appreciated by those skilled in the art that the extractant may further comprise a mixture of two or more chemical compounds capable of reacting with or binding to metal ion. In particular, the extractant may be a mixture of two or more chemical compounds where there is a synergistic improvement in the distribution ratio of the target metal ion or an improvement in the relative distribution ratio of the target metal ion compared to a non-target impurity metal ion.

The term "selectively extracting" as used herein refers to an extraction system (e.g. a liquid-liquid extraction) wherein a distribution ratio for a first substance in said extraction system is sufficiently higher than a respective distribution ratio for a second substance in said extraction system, so that the first substance is preferentially extracted therein. Generally, the separation factor (i.e. distribution factor of first substance divided by distribution factor of second substance) may be greater than 2, may be greater than 5, may be greater than 10, greater than 20, greater than 50, greater than 100, greater than 200, greater than 500, or greater than 1000.

The term "enriched" means having a greater mole % concentration of the indicated component than the original stream from which it was formed.

The term "depleted" means having a lesser mole % concentration of the indicated component than the original stream from which it was formed.

The term "lean" means having a mole % concentration of the indicated component of less than 5 mole %, less than 2 mole %, or less than 1 mole %.

The term "solubility product" as used herein refers to the maximum product of the ionic concentrations or activities of an ionic compound that at a known temperature can continue in equilibrium with the undissolved phase thereof.

Process for Producing High Purity Alumina or Aluminium Salts

Several high purity aluminium salts or HPA may be prepared according to the process disclosed herein from various aluminium-bearing materials.

For example, the aluminium-bearing material may be a water-soluble aluminium salt including, but not limited to, aluminium chloride, aluminium nitrate or aluminium sulphate.

Alternatively, the aluminium-bearing material may be an acid-soluble aluminium-bearing material including, but not limited to, oxides, hydroxides and oxyhydroxides of aluminium, an aluminosilicate mineral, or an aluminium-bearing slag. It will be appreciated that the acid-soluble aluminium-bearing material may be a by-product or residue produced by a different process.

Suitable examples of oxides, hydroxides and oxyhydroxides of aluminium may be corundum, boehmite, diaspore, bayerite, doyleite, nordstrandite and gibbsite.

Suitable examples of aluminosilicate minerals may be clay minerals, in particular dickite, halloysite, and kaolin.

An aluminium-bearing solution may be prepared by dissolving the water-soluble aluminium salt in water.

Alternatively, the aluminium-bearing solution may be prepared by leaching the acid-soluble aluminium material in acid. The acid may be a strong mineral acid, such as hydrochloric acid, nitric acid or sulfuric acid. It will be appreciated by those skilled in the art that leaching conditions will vary according to the nature of the acid-soluble aluminium material and may be readily determined by varying the acid-soluble aluminium material to acid ratio, acid concentration, temperature, agitation, pressure and time in a systematic manner.

Any remaining insoluble material may be separated from the aluminium-bearing solution by filtration or other well understood separation techniques.

In some embodiments, the aluminium-bearing solution may have an aluminium concentration of at least 1 g/L, or at least 5 g/L, or at least 10 g/L, or at least 20 g/L, or at least 40 g/L, or at least 60 g/L, or the aluminium concentration may be at saturation. It will be appreciated that the state of saturation may depend on one or more factors including, but not limited to, the temperature and pH of the aluminium-bearing solution.

In some embodiments, the aluminium concentration of the aluminium-bearing solution may be between 1 g/L and saturation, or between 2 g/L and saturation, or between 5 g/L and saturation, or between 10 g/L and saturation, or between 20 g/L and saturation, or between 40 g/L and saturation, or between 60 g/L and saturation.

Removal of One or More Metal Impurities, in Particular Iron

In some embodiments, the aluminium-bearing solution may comprise one or more metal impurities such as Fe, K, Mg, Na, Ca, Mn, Ba, Zn, Li, Sr, V, Ni, Cr, Pb, Cu, Co, Sb, As, B, Sn, Be, Mo. The ratio of total metals (excluding Al) to Al in the aluminium-bearing solution may be 1:1, 1:2, 1:5, 1:10, 1:20, 1:50, 1:100, 1:200, 1:500, 1:1000, 1:2000, 1:5000 or 1:>5000. It may be advantageous to separate the one or more metal impurities, in particular iron, prior to selectively extracting aluminium from the aluminium-bearing solution.

The step of separating iron from the aluminium-bearing solution comprises selectively extracting iron from the aluminium-bearing solution by liquid-liquid extraction or liquid-solid extraction to obtain an iron-depleted aluminium-bearing solution.

In some embodiments, the aluminium-bearing solution may be reacted with an iron extractant present in an immiscible organic liquid phase, wherein the iron extractant has selectivity for iron. Reacting the iron extractant with the aluminium-bearing solution transfers iron from the aluminium-bearing solution into the organic liquid phase to produce an iron-enriched organic liquid and an iron-depleted aluminium-bearing solution.

The iron extractant may comprise a mixture of di(2-ethylhexyl) phosphoric acid and tributyl phosphate, or tributyl phosphate, or trioctyl phosphine oxide, or an alkyl amine in a free base form. Suitable alkyl amines include, but are not limited to, primary alkyl amines, secondary alkyl amines and tertiary alkyl amines such as Alamine 336 which is a mixture of tri C8-C10 amines.

The iron extractant may be present in the organic liquid phase at a concentration of greater than 0.1 vol %, greater than 0.5 vol %, greater than 1 vol %, greater than 2 vol %, greater than 3 vol %, greater than 4 vol %, greater than 5 vol %, greater than 7 vol %, greater than 10 vol %, greater than 15 vol %, greater than 20 vol %, greater than 30 vol %, greater than 40 vol %, greater than 50 vol %, greater than 60 vol % greater than 70 vol %, greater than 80 vol %, greater than 90 vol %, even greater than 95 vol %.

The iron extractant may be present in the organic liquid phase at a concentration of between 0.5 vol % and 1 vol %, or between 0.5 vol % and 2 vol %, or between 0.5 vol % and 3 vol %, or between 0.5 vol % and 4 vol %, or between 0.5 vol % and 5 vol %, or 0.5 vol % and 7 vol %, or between 0.5 vol % and 10 vol %, or between 0.5 vol % and 15 vol %, or between 0.5 vol % and 20 vol %, or between 0.5 vol % and 30 vol %, or between 0.5 vol % and 40 vol %, or between 0.5 vol % and 50 vol %, or between 0.5 vol % and 60 vol %, or between 0.5 vol % and 70 vol %, or between 0.5 vol % and 80 vol %, or between 0.5 vol % and 90 vol %, or between 0.5 and 95 vol %.

The organic liquid phase may comprise one or more organic solvents that are immiscible with an aqueous phase. In particular, the organic liquid phase may comprise one or more aliphatic hydrocarbons. Aliphatic hydrocarbons are organic compounds having saturated, long straight chain, branched chain, or cyclic hydrocarbons. Exemplary aliphatic hydrocarbons are kerosene, hexanes and heptanes.

In some embodiments, the process further comprises adding a phase modifier to the solvent to prevent formation of three phases during the liquid-liquid extraction process. The phase modifier may comprise a surfactant or a cosolvent. Suitable examples of phase modifiers include, but are not limited to, isodecanol (1-decanol, CAS 112-30-1, $C_{10}H_{22}O$). In embodiments where the iron extractant comprises di(2-ethylhexyl) phosphoric acid and tributyl phosphate, it will be appreciated that tributyl phosphate may also behave as the phase modifier.

In one embodiment, the phase modifier may be present in the organic liquid phase at a concentration of greater than 1 vol %, greater than 2.5 vol %, greater than 5 vol %, greater than 7.5 vol %, greater than 10 vol %, greater than 15 vol %, or greater than 20 vol %.

In one embodiment, the phase modifier may be present in the organic liquid phase at a concentration of 1-50 vol %, 2.5-50 vol %, 5-50 vol %, 7.5-50 vol %, 10-50 vol %, or 15-50 vol %.

The step of contacting the aqueous and organic phases may be accomplished by any manner known in the art for mixing a first liquid with a second immiscible liquid. Thus mixer-settlers may be used and the contacting step may be carried out or repeated until a desired amount of the iron has been transferred from the aqueous phase to the organic phase. The number of extraction stages, e.g., number of actual successive solvent extractions made between the aluminium-bearing solution and the organic liquid phase will depend upon the excess free acid present in the aluminium-bearing solution, upon the amount of iron present, and upon the efficiency of transfer in the contact made between the two liquid phases. Other suitable extraction equipment which may be used include, but is not limited to, mixer-settlers and centrifugal extractors. Separation of the organic and aqueous phases may be accomplished by decantation or by the use of centrifugal separators, the latter method being generally the more efficient.

Advantageously, although the iron extractant has selectivity for iron, several other transition metal ions such as Mn, Zn, V, Ni, Cr, Pb, Cu, Co, Sb, As, Sn, and Mo may be also be co-extracted with iron.

In alternative embodiments, the aluminium-bearing solution may be contacted with an ion exchange resin having selectivity for iron relative to aluminium and other divalent and monovalent cations to deplete the aluminium-bearing solution of iron.

The ion exchange resin may be selected from the group comprising strong acid cation resin, weak acid cation resin.

The ion exchange resin may be contacted with the aluminium-bearing solution using either a static or dynamic method. For example, in the static method, the ion exchange resin is contained with one or more vertical columns through which the aluminium-bearing solution may be eluted in order to extract iron therefrom.

In one form of the invention, the ion exchange resin may be neutralised prior to contact with the iron bearing aluminium solution by eluting the ion exchange resin with an alkaline solution. The alkaline solution may be a dilute solution of sodium hydroxide, potassium hydroxide, lithium hydroxide, aqueous ammonia, calcium hydroxide, magnesium hydroxide, or mixtures thereof.

Selectively Extracting Aluminium from the Aluminium-Bearing Solution (Liquid-Liquid Extraction)

Following optional removal of iron from the aluminium-bearing solution, the process may comprise the step of selectively extracting aluminium from the aluminium-bearing solution by liquid-liquid extraction, in particular solvent extraction. The aluminium-bearing solution may be reacted with an aluminium extractant present in an immiscible organic liquid phase, wherein the aluminium extractant has selectivity for aluminium. Reacting the aluminium extractant with the aluminium-bearing solution transfers aluminium from the aluminium-bearing solution into the organic liquid phase to produce an aluminium-enriched organic liquid.

It will be appreciated that several stages of extraction may be required in order to recover the majority of the aluminium from the aluminium-bearing solution.

The aluminium extractant may comprise one or more organophosphorus compounds, in particular an organic derivative of phosphoric acid, an organic derivative of phosphonic acid, an organic derivative of phosphinic acid or an organic derivative of dithiophosphinic acid. The one or more organophosphorus compounds may conveniently be in a liquid phase under ambient conditions so that it may be readily combined with the organic liquid phase.

Suitable examples of the organophosphorus extractant include, but are not limited to, Bis(2,4,4-trimethylpentyl) phosphinic acid, also known as Cyanex 272 (CAS Number 83411-71-6), 2-ethylhexyl phosphonic acid mono-2-ethyl-hexyl ester, also known as Ionquest 801 (CAS Number 14802-03-0), Bis(2,4,4-trimethylpentyl)dithiophosphinic acid, also known as Cyanex 301 (CAS Number 107667-02-7), Bis(2,4,4-trimethylpentyl) monothiophosphinic acid, also known as Cyanex 302, (CAS Number 132767-86-3), Bis(2-ethylhexyl) hydrogen phosphate (BEHHP), Bis(2-ethylhexyl) phosphoric acid (BEHPA), Bis(2-ethylhexyl) phosphate (BEHP), Bis(2-ethylhexyl) hydrophosphoric acid (BEHHPA), Di-(2-ethylhexyl) phosphoric acid (DEHPA) $(C_8H_{17}O)_2PO_2H$ (CAS Number 298-07-7).

In some embodiments, the extractant may further comprise a carboxylic acid, ketoxime or aldoxime compound.

The extractant may be present in the organic liquid phase at a concentration of greater than 0.1 vol %, greater than 0.5 vol %, greater than 1 vol %, greater than 2 vol %, greater than 3 vol %, greater than 4 vol %, greater than 5 vol %, greater than 7 vol %, greater than 10 vol %, greater than 15 vol %, greater than 20 vol %, greater than 30 vol %, greater than 40 vol %, greater than 50 vol %, greater than 60 vol % greater than 70 vol %, greater than 80 vol %, greater than 90 vol %, even greater than 95 vol %.

The extractant may be present in the organic liquid phase at a concentration of between 0.5 vol % and 1 vol %, or between 0.5 vol % and 2 vol %, or between 0.5 vol % and 3 vol %, or between 0.5 vol % and 4 vol %, or between 0.5 vol % and 5 vol %, or 0.5 vol % and 7 vol %, or between 0.5 vol % and 10 vol %, or between 0.5 vol % and 15 vol %, or between 0.5 vol % and 20 vol %, or between 0.5 vol % and 30 vol %, or between 0.5 vol % and 40 vol %, or between 0.5 vol % and 50 vol %, or between 0.5 vol % and 60 vol %, or between 0.5 vol % and 70 vol %, or between 0.5 vol % and 80 vol %, or between 0.5 vol % and 90 vol %, or between 0.5 and 95 vol %.

As indicated above, the aluminium extractant may comprise a binary mixture of two compounds selected from the group comprising Cyanex 272, Cyanex 301, Cyanex 302, Ionquest 801, D2 EHPA, a carboxylic acid, a ketoxime, an aldoxime. An example of a suitable carboxylic acid includes, but is not limited to, highly branched tertiary carboxylic acids such as neodecanoic acid (also known as Versatic Acid 10). Suitable ketoxime and aldoximes include, but are not limited to, hydroxyl aryl ketoximes and hydroxyl aryl aldoxime.

The ratio of the two compounds present in the binary mixture may be 0.1:99.9%, 0.5:99.5%, 1.0:99.0%, 2.0:98.0%, 5.0:95.0%, 10.0:90.0%, 20.0:80.0%, 30.0:70.0%, 40.0:60.0%, 50.0:50.0%, 60.0:40.0%, 70.0:30.0%, 80.0:20.0%, 90.0:10.0%, 95.0:5.0%, 98.0:2.0%, 99.0:1.0%, 99.5:0.5% or 99.9:0.1%.

The binary mixture may be selected from a group comprising: Cyanex 272 and Cyanex 301, Cyanex 272 and Cyanex 302, Cyanex 272 and Ionquest 801, Cyanex 272 and D2 EHPA, Cyanex 272 and a carboxylic acid, Cyanex 272 and a ketoxime, Cyanex 272 and an aldoxime, Cyanex 301 and Cyanex 302, Cyanex 301 and Ionquest 801, Cyanex 301 and D2 EHPA, Cyanex 301 and a carboxylic acid, Cyanex 301 and a ketoxime, Cyanex 301 and an aldoxime, Cyanex 302 and Ionquest 801, Cyanex 302 and D2 EHPA, Cyanex 302 and a carboxylic acid, Cyanex 302 and a ketoxime, Cyanex 302 and an aldoxime, IonQuest 801 and D2 EHPA, IonQuest 801 and a carboxylic acid, IonQuest 801 and a ketoxime, IonQuest 801 and an aldoxime, D2 EHPA and a carboxylic acid, D2 EHPA and a ketoxime, D2 EHPA and an aldoxime, a carboxylic acid and a ketoxime, a carboxylic acid and an aldoxime, a ketoxime and an aldoxime.

As indicated above, the aluminium extract may comprise a ternary mixture of three compounds selected from the group of compounds comprising Cyanex 272, Cyanex 301, Cyanex 302, Ionquest 801, D2 EHPA, a carboxylic acid, a ketoxime, an aldoxime.

The ternary mixture may be selected from a group comprising Cyanex 272 and Cyanex 301 and Cyanex 302, Cyanex 272 and Cyanex 301 and IonQuest 801, Cyanex 272 and Cyanex 301 and D2 EHPA, Cyanex 272 and Cyanex 301 and a carboxylic acid, Cyanex 272 and Cyanex 301 and an aldoxime, Cyanex 272 and Cyanex 301 and a ketoxime, Cyanex 272 and Cyanex 302 and IonQuest 801, Cyanex 272 and Cyanex 302 and D2 EHPA, Cyanex 272 and Cyanex 302 and a carboxylic acid, Cyanex 272 and Cyanex 302 and an aldoxime, Cyanex 272 and Cyanex 302 and a ketoxime, Cyanex 272 and IonQuest 801 and D2 EHPA, Cyanex 272 and IonQuest 801 and a carboxylic acid, Cyanex 272 and IonQuest 801 and an aldoxime, Cyanex 272 and IonQuest 801 and a ketoxime, Cyanex 272 and D2 EHPA and a carboxylic acid, Cyanex 272 and D2 EHPA and an aldoxime, Cyanex 272 and D2 EHPA and a ketoxime, Cyanex 272 and a carboxylic acid and an aldoxime, Cyanex 272 and a carboxylic acid and a ketoxime, Cyanex 272 and an aldoxime and a ketoxime, Cyanex 301 and Cyanex 302 and IonQuest 801, Cyanex 301 and Cyanex 302 and D2 EHPA, Cyanex 301 and Cyanex 302 and a carboxylic acid, Cyanex 301 and Cyanex 302 and an aldoxime, Cyanex 301 and Cyanex 302 and a ketoxime, Cyanex 301 and IonQuest 801 and D2 EHPA, Cyanex 301 and IonQuest 801 and a carboxylic acid, Cyanex 301 and IonQuest 801 and an aldoxime, Cyanex 301 and IonQuest 801 and a ketoxime, Cyanex 301 and D2 EHPA and a carboxylic acid, Cyanex 301 and D2 EHPA and an aldoxime, Cyanex 301 and D2 EHPA and a ketoxime, Cyanex 301 and a carboxylic acid and an aldoxime, Cyanex 301 and a carboxylic acid and a ketoxime, Cyanex 301 and an aldoxime and a ketoxime, Cyanex 302 and IonQuest 801 and D2 EHPA, Cyanex 302 and IonQuest 801 and a carboxylic acid, Cyanex 302 and IonQuest 801 and an aldoxime, Cyanex 302 and IonQuest 801 and a ketoxime, Cyanex 302 and D2 EHPA and a carboxylic acid, Cyanex 302 and D2 EHPA and an aldoxime, Cyanex 302 and D2 EHPA and a ketoxime, Cyanex 302 and a carboxylic acid and an aldoxime, Cyanex 302 and a carboxylic acid and a ketoxime, Cyanex 302 and an aldoxime and a ketoxime, IonQuest 801 and D2 EHPA and a carboxylic acid, IonQuest 801 and D2 EHPA and an aldoxime, IonQuest 801 and D2 EHPA and a ketoxime, IonQuest 801 and A carboxylic acid and an aldoxime, IonQuest 801 and a carboxylic acid and a ketoxime, IonQuest 801 and an aldoxime and a ketoxime, D2 EHPA and a carboxylic acid and an aldoxime, D2 EHPA and a carboxylic acid and a ketoxime, D2 EHPA and an aldoxime and a ketoxime, a carboxylic acid and an aldoxime and a ketoxime.

In further embodiments the aluminium extractant may comprise a quaternary of higher mixture of compounds in the group comprising: Cyanex 272, Cyanex 301, Cyanex 302, IonQuest 801, D2 EHPA, a carboxylic acid, a ketoxime or an aldoxime.

The organic liquid phase may comprise one or more organic solvents that are immiscible with an aqueous phase. In particular, the organic liquid phase may comprise one or more aliphatic hydrocarbons. Aliphatic hydrocarbons are organic compounds having saturated, long straight chain, branched chain, or cyclic hydrocarbons. Exemplary aliphatic hydrocarbons are kerosene, hexanes and heptanes.

In some embodiments, the process further comprises adding a phase modifier to the solvent to prevent formation of three phases during the liquid-liquid extraction process. The phase modifier may comprise a surfactant or a co-solvent. Suitable examples of phase modifiers include, but are not limited to, isodecanol (1-decanol, CAS 112-30-1, $C_{10}H_{22}O$) and, in particular, tributyl phosphate (TBP, CAS 126-73-8, $C_{12}H_{27}O_4P$).

In one embodiment, the phase modifier may be present in the organic liquid phase at a concentration of greater than 1 vol %, greater than 2.5 vol %, greater than 5 vol %, greater than 7.5 vol %, greater than 10 vol %, greater than 15 vol %, or greater than 20 vol %.

In one embodiment, the phase modifier may be present in the organic liquid phase at a concentration of 1-50 vol %, 2.5-50 vol %, 5-50 vol %, 7.5-50 vol %, 10-50 vol %, or 15-50 vol %.

The solvent extraction step may be performed at a temperature less than the boiling point of the organic liquid phase. In various embodiments, the solvent extraction step may be performed at a temperature between ambient and 30° C., between ambient and 35° C., between ambient and 40° C., between ambient and 45° C., between ambient and 50° C., between ambient and 55° C., or between ambient and 60° C.

Prior to reacting the aluminium extractant with the aluminium-bearing solution, the organic liquid phase containing the aluminium extractant may be neutralised. The organic liquid phase containing the aluminium extractant may be mixed with an alkaline solution, in particular sodium hydroxide, potassium hydroxide, lithium hydroxide, or aqueous ammonia. Alternatively, the organic liquid phase containing the extractant may be mixed with an alkaline suspension, in particular calcium hydroxide, lime, slaked lime, magnesium hydroxide, or magnesium oxide.

Alternatively, if the organic liquid phase has not been pre-neutralised, it may be necessary to add the alkaline solution to maintain a desirable pH, in particular pH <4. The concentration of the alkaline solution should not be sufficient to induce precipitation of Al within the aqueous phase. As will be recognised by those skilled in the art, this is a matter of trial and error and will be affected by the intensity of mixing of the aqueous and organic liquid phases.

The neutralisation of the protons exchanged from the extractant during extraction of aluminium may be achieved by adding ammonia solution during the loading stage to achieve the desired pH in each stage. As would be recognised by those skilled in the art, it is also possible to partially, or completely, pre-neutralise the protons by contacting the metal-depleted, stripped organic directly with an ammonia solution whereby the protons are neutralised by the ammonia effectively forming the ammonium salt of D2 EHPA. The ammonium salt of D2 EHPA is then reacted with the loaded aluminium solution and the aluminium ions are exchanged for the ammonium ions resulting in minimal pH change in the aqueous phase. Other bases, including but not limited to NaOH, KOH, MgO, Mg(OH)$_2$, Ca(OH)$_2$ may also be used to perform the pre-neutralisation by forming the relevant D2 EHPA salt. In the most preferred form, ammonia is used as the neutralising agent to limit introduction of alkaline metal or alkaline earth metal impurities in the system.

Removing Minor Metal Impurities

Minor metal impurities, in particular alkaline metals such as Li, Na and K and alkaline earth metals such as Be, Mg and Ca may still remain in the aluminium-enriched organic liquid phase. The removal of such impurities is important when the objective is to obtain 99.99% purity alumina or aluminium salts. The minor metal impurities may be removed by contacting the aluminium-enriched organic liquid with an aqueous scrub solution to transfer the minor metal impurities into the aqueous scrub solution, thereby producing an impurity-depleted aluminium-enriched organic liquid phase and an impurity-enriched aqueous phase.

The aqueous scrub solution may be a dilute acid. In particular, the acid may be selected from the group comprising sulphuric acid, hydrochloric acid, nitric acid, phosphoric acid. As will be recognised by those skilled in the art, the optimum pH for impurity removal will vary with the extractant used.

In some embodiments, the impurity-enriched aqueous phase may have a pH <4. The pH of the impurity-enriched aqueous phase may be between 0.5 and 4, between 0.5 and 3, between 0.5 and 2, or between 0.5 and 1.

Alternatively, the aqueous scrub solution may comprise an aqueous solution of aluminium which is substantially free of the impurities. In this regard, the aqueous scrub solution may comprise a bleed stream of an aluminium-enriched aqueous solution obtained by stripping the aluminium-loaded organic liquid phase (as will be described later).

The aluminium concentration in the aqueous scrub solution may be between 0.1 g/L and saturation concentration ('saturation') of an aluminium precipitate or aluminium salt, between 1.0 g/L and saturation, between 5.0 g/L and saturation, between 10 g/L and saturation, between 25 g/L and saturation, between 50 g/L and saturation, between 75 g/L and saturation, between 100 g/L and saturation, between 150 g/L and saturation of the relevant salt.

Selectively Extracting Aluminium from the Aluminium-Bearing Solution (Liquid-Solid Extraction)

Alternatively, aluminium may be extracted from the aluminium-bearing solution by contacting the aluminium-bearing solution with an ion exchange resin having selectivity for aluminium over monovalent or divalent cations. The ion exchange resin may comprise a strong acid cation resin or a weak acid cation resin.

The ion exchange resin may be contacted with the aluminium-bearing solution using either a static or dynamic method. For example, in the static method, the ion exchange resin is contained with one or more vertical columns through which the aluminium-bearing solution may be eluted, whereupon aluminium ions exchange with the cations on the ion exchange resin and are bound thereto to produce an aluminium-loaded resin.

Prior to elution with the aluminium-bearing solution, the ion exchange resin may be neutralised by eluting the ion exchange resin with an alkaline solution. The alkaline solution may be a dilute solution of sodium hydroxide, potassium hydroxide, lithium hydroxide, aqueous ammonia, calcium hydroxide, magnesium hydroxide, or mixtures thereof.

Removing Minor Metal Impurities

Minor monovalent or divalent metal impurities, in particular alkaline metals such as Li, Na and K and alkaline earth metals such as Mg and Ca, which have also loaded onto the resin may be removed therefrom by eluting the aluminium-loaded resin with an aqueous scrub solution to transfer the minor metal impurities into the aqueous scrub solution, thereby producing an impurity-depleted aluminium-enriched organic liquid phase and an impurity-enriched aqueous phase.

The aqueous scrub solution may be a dilute acid. In particular, the acid may be selected from the group comprising sulphuric acid, hydrochloric acid, nitric acid, phosphoric acid. As will be recognised by those skilled in the art, the optimum pH for impurity removal will vary with the extractant used.

In some embodiments, the impurity-enriched aqueous phase may have a pH <4. The pH of the impurity-enriched aqueous phase may be between 0.5 and 4, between 0.5 and 3, between 0.5 and 2, or between 0.5 and 1.

Alternatively, the aqueous scrub solution may comprise an aqueous solution of aluminium which is substantially free of the impurities. In this regard, the aqueous scrub solution may comprise a bleed stream of an aluminium-enriched aqueous solution obtained by stripping the aluminium-loaded organic liquid phase (as will be described later).

The aluminium concentration in the aqueous scrub solution may be between 0.1 g/L and saturation concentration ('saturation') of an aluminium precipitate or aluminium salt, between 1.0 g/L and saturation, between 5.0 g/L and saturation, between 10 g/L and saturation, between 25 g/L and saturation, between 50 g/L and saturation, between 75 g/L and saturation, between 100 g/L and saturation, between 150 g/L and saturation of the relevant salt.

Stripping Aluminium from Aluminium-Enriched Liquid or Aluminium-Loaded Resin

The process as described herein also includes the step of stripping aluminium from the aluminium-enriched liquid or the aluminium-loaded resin by contacting the aluminium-enriched liquid or aluminium-loaded resin, respectively, with an acidic aqueous solution to produce an aluminium-enriched aqueous solution.

The acid may be selected from a group of strong mineral acids including, but not limited to, hydrochloric acid, sulphuric acid, nitric acid, phosphoric acid, or mixtures thereof. The acid may be selected from a group of weak acids where the anion forms soluble complex ions with aluminium. The group of weak acids include, but is not limited to citric acid, oxalic acid, acetic acid, gluconic acid, saccharic acid and malonic acid.

Conveniently, in embodiments where a high purity aluminium salt is produced, the acid used to prepare the acidic aqueous solution may correspond to the desired salt. For example, where the high purity aluminium salt is aluminium sulphate, the acid may be sulphuric acid; where the high purity aluminium salt is aluminium nitrate, the acid may be nitric acid; or where the high purity aluminium salt is aluminium chloride, the acid may be hydrochloric acid.

Alternatively, in embodiments where high purity alumina is produced, the acid may be nitric acid, hydrochloric acid or a weak acid.

The lean aluminium aqueous solution may comprise between 0.1 and 10 g/L of free acid, between 0.1 and 20 g/L of free acid, between 0.1 and 30 g/L of free acid, between 0.1 and 40 g/L of free acid, between 0.1 and 50 g/L of free acid, between 0.1 and 75 g/L of free acid, between 0.1 and 100 g/L of free acid, between 0.1 and 150 g/L of free acid, or between 0.1 and 200 g/L of free acid.

The pH of the resulting aluminium-enriched aqueous solution after contact with the lean aluminium aqueous solution may be less than 3, in particular between 0 and 3, between 0.5 and 3, between 1.0 and 3, between 1.5 and 3, between 2.0 and 3, between 2.5 and 3, 0 and 2, between 0.5 and 2, between 1.0 and 2 or between 1.5 and 2.

Crystallising and Separating a High Purity Aluminium Salt

In some embodiments, the process as described herein includes the step of crystallising and separating a high purity aluminium salt from the aluminium-enriched aqueous solution.

Generally, the aluminium-enriched aqueous solution may be heated to reduce the volume of the water to an extent wherein the solubility product of the relevant salt is exceeded and the salt is crystallised from the solution. The heating may take place under reduced pressure. As will be recognised by those skilled in the art, the conditions for evaporation depend on the salt content of solution, the maximum solubility of the salt and can be determined by straightforward testwork.

The resulting high purity aluminium salt crystals may be separated from their mother liquor by filtration, decantation, centrifugation and other conventional separation techniques as will be well understood by those skilled in the art. It will be appreciated that the separated high purity aluminium salt may be washed one or more times and dried.

Precipitating and Separating an Aluminium Precipitate

In alternative embodiments, the process as described herein includes the step of crystallising and separating an aluminium hydroxide or aluminium oxyhydroxide compound from the aluminium-enriched aqueous solution.

The aluminium hydroxide or aluminium oxyhydroxide compound may be caused to precipitate from said solution by raising the pH thereof to a range of 4-11, a range of 5-10, a range of 6-9, in particular a range of 7-8.

As will be recognised by those skilled in the art, aluminium is amphoteric and is soluble in both acid and alkaline solutions. Thus, the optimum pH is below that where the solubility increases due to formation of the tetrahydroaluminate ion, $Al(OH)_{4-}$.

The pH of said solution may be increased by adding a base thereto. The base may be selected from a group comprising sodium hydroxide, potassium hydroxide, lithium hydroxide, calcium oxide, calcium hydroxide, ammonia, magnesium hydroxide, magnesium oxide. In particular, the pH of said solution may be increased by adding aqueous ammonia, $NH_4OH$, thereto.

Depending on the reaction conditions, the precipitating step may produce a crystalline product, in particular aluminium hydroxide, or an aluminium oxyhydroxide, such as boehmite, $AlOOH$.

The precipitating step may be performed at elevated temperature, in particular above 30° C., above 40° C., above 50° C., above 60° C., above 70° C., above 80° C., above 90° C. above 100° C., or up to the boiling point of the aluminium-enriched aqueous solution.

The precipitating step may be performed between 30° C. and said boiling point, between 40° C. and said boiling point, between 50° C. and said boiling point, between 60° C. and said boiling point, between 70° C. and said boiling point, between 80° C. and said boiling point, between 90° C. and said boiling point, or between 100° C. and the boiling point of the aluminium-enriched aqueous solution. The precipitating step may take place under hydrothermal conditions whereby pressure is used to increase the boiling point of the solution.

As will be recognised by those skilled in the art, the precipitate may undergo aging in the mother liquor to allow it to form more crystalline phases or to increase the particle size of the resulting precipitate, thereby aiding solid-liquid separation. It will be appreciated that the mother liquor may be held at the same or similar temperature and same or similar pressure as the precipitating step.

The aging step may vary from 30 minutes to 48 h, depending on various operating conditions. For example, the aging step may be more than 15 min, more than 30 min, more than 60 min, more than 2 h, more than 4 h, more than 8 h, more than 16 h or more than 24 h.

The aging step may have duration between 15 min and 48 h, between 30 min and 48 h, between 60 min and 48 h, between 2 h and 48 h, between 4 h and 48 h, between 8 h and 48 h, between 12 h and 48 h, or between 24 h and 48 h.

As will be recognised by those skilled in the art, the precipitation of the aluminium hydroxide compound may also take place in an autoclave utilising an elevated pressure to prevent the boiling of the aluminium-enriched aqueous solution when heated above its boiling point at atmospheric pressure. The optimum conditions are readily determined by standard testwork protocols.

The resulting aluminium precipitate may be separated by filtration, decantation, centrifugation and other conventional separation techniques as will be well understood by those skilled in the art. It will be appreciated that the separated precipitate may be washed one or more times and dried.

It will be appreciated that the aluminium precipitate produced as described herein may also be a saleable product.

Calcination of Precipitate

The process as described herein includes the step of calcining the separated aluminium precipitate to produce high purity alumina, $Al_2O_3$.

The calcining step may be performed by heating the aluminium precipitate to a temperature sufficient to convert the aluminium precipitate to alumina. For example, the aluminium precipitate may be heated to a temperature above 300° C., above 400° C., above 500° C., above 600° C., above 700° C., above 800° C., above 900° C., above 1000° C., above 1100° C., above 1200° C., above 1300° C. or above 1400° C.

In some embodiments, the precipitate may be heated to a temperature between 30° and 1400° C., between 40° and 1400° C., between 50° and 1400° C., between 60° and 1400° C., between 700 and 1400° C., between 80° and 1400° C., between 90° and 1400° C., between 100° and 1400° C., between 1100 and 1400° C., between 120° and 1400° C. or between 130° and 1400° C.

The calcining step may be performed by heating the aluminium precipitate at a suitable temperature for a period sufficient to convert the aluminium precipitate to alumina. For example, the aluminium precipitate may be calcined for more than 15 seconds, more than 30 seconds, more than 1 minute, more than 5 minutes, more than 10 minutes, more than 15 minutes, more than 30 minutes, more than 45 minutes, more than 1 hour, more than 2 hours, more than 3 hours, more than 4 hours, more than 5 hours, or more than 6 hours.

In some embodiments, the precipitate may be calcined for between 15 seconds and 6 hours, between 30 seconds and 6 hours, between 1 minute and 6 hours, between 5 minutes and 6 hours, between 15 minutes and 6 hours, between 15 minutes and 6 hours, between 15 minutes and 6 hours, between 30 minutes and 6 hours, between 45 minutes and 6 hours, between 1 hour and 6 hours, between 2 hours and 6 hours, between 3 hour and 6 hours, between 4 hour and 6 hours, or between 5 hour and 6 hours.

As will be recognised by those skilled in the art, the temperature of calcination will determine the specific crystalline phase of $Al_2O_3$ formed. Thus, by moderating the calcination temperature it is possible to produce a range of high purity alumina with different crystal structure.

In one particular embodiment, the dried precipitate may be calcined in two stages, the first to eliminate water from the crystalline structure of the precipitate and the second to produce the desired crystalline form of $Al_2O_3$.

A method for producing high purity alumina in accordance with one embodiment will now be described with reference to the flowsheet shown in FIG. 1.

Solid aluminium sulphate (1) is fed with water (2) into a tank (3) where it mixed to provide an aqueous solution/slurry of aluminium sulphate. Recycled water (4) may also be used. The slurry (5) is pumped into a filter (6) where the insoluble material (7) is removed and disposed of. The aluminium-bearing solution (8) is fed into the loading stage (9) of the solvent extraction along with aqueous ammonia (10) to maintain the pH. The aqueous solution is mixed with a liquid organic phase (11) containing D2 EHPA. The aluminium is transferred into the organic phase (13) whilst the aluminium-depleted aqueous solution can be recycled (4) or disposed of (12), e.g. by crystallisation of ammonium sulphate.

The loaded organic phase (13) proceeds to stripping (14) where it is mixed with a hydrochloric acid solution (15). The acid displaces the aluminium from the organic phase, thereby regenerating D2 EHPA (11) which returns to the loading stage (9). The aluminium solution (16) is fed into a precipitator (17) along with ammonia (18) which raises the pH to precipitate aluminium hydroxide. The resultant slurry (19) is fed into a filter (20) separating the solution (21) and precipitate (22). The solution (21) may be treated to separate and recover the HCl and $NH_3$ or crystallised into ammonium chloride.

The precipitate (22) is fed into a calciner (23) and heated at 1250° C. for 4 h to convert the precipitate to HPA (24) by driving the water off.

Figure 2:
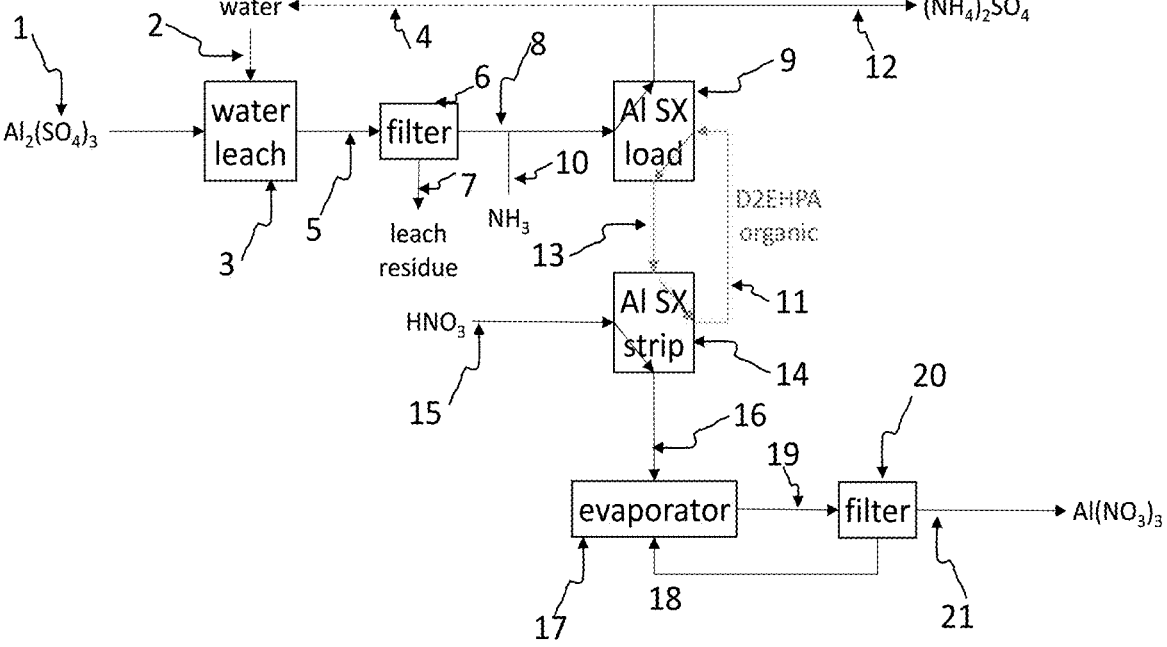
FIG. 2 is a schematic representation of one embodiment of the process for producing high purity aluminium salts, such as aluminium nitrate, from soluble aluminium-bearing materials as described herein; and, FIG. 3 is a graphical representation of the extent of extraction of elements from an aluminium-bearing material in an acid leach step to produce an aluminium-bearing solution, in accordance with one of the examples described herein.

A method for producing high purity aluminium nitrate in accordance with another embodiment is now described with reference to the flowsheet shown in FIG. 2.

Solid aluminium sulphate (1) is fed with water (2) into a tank (3) where it mixed and dissolved to produce an aqueous solution/slurry of the aluminium salt. Recycled water (4) may also be used. The slurry (5) is pumped into a filter (6) where any insoluble material (7) is removed and disposed of. The aluminium-bearing solution (8) is fed into the loading stage (9) of the solvent extraction along with ammonia (10) to maintain the pH. The aqueous solution is mixed with a liquid organic phase (11) containing D2 EHPA. The aluminium is transferred into the organic phase (13) whilst the aluminium-depleted aqueous solution can be recycled (4) or disposed of (12), e.g. by crystallisation of ammonium sulphate.

The loaded organic phase (13) proceeds to stripping (14) where it is mixed with a nitric acid solution (15). The acid displaces the aluminium from the organic phase, thereby regenerating the D2 EHPA (11) which returns to the loading stage (9). The aluminium solution (16) is fed into an evaporator (17) which removes water and produces aluminium nitrate crystals. The resultant slurry (19) is fed into a filter (20) separating the solution (18) and product crystals (21). The solution (18) may be recycled back to the evaporation stage (17).

Example

The following example is to be understood as illustrative only. It should therefore not be construed as limiting the embodiments of the disclosure in any way.

A clay sample was analysed using X-ray diffraction and found to contain 30% quartz, 27% muscovite 35% kaolinite and other clays.

In order to render the kaolinite amenable to leaching it was necessary to calcine at 650° C. for 4 h to convert the kaolin to metakaolin. A mass loss of 4.5% was observed. Assays of the major elements present in the head and calcined product are listed in Table 1.

TABLE 1

| Analyte | Unit | Head | Calcine |
|---|---|---|---|
| $Al_2O_3$ | % | 15.6 | 16.6 |
| CaO | % | 0.35 | 0.04 |
| $Fe_2O_3$ | % | 6.12 | 6.43 |
| $K_2O$ | % | 2.83 | 2.95 |
| MgO | % | 1.41 | 1.48 |

TABLE 1-continued

| Analyte | Unit | Head | Calcine |
|---|---|---|---|
| Na$_2$O | % | 0.73 | 0.75 |
| SiO$_2$ | % | 67.2 | 71.4 |
| TiO$_2$ | % | 0.60 | 0.65 |

Figure 3:
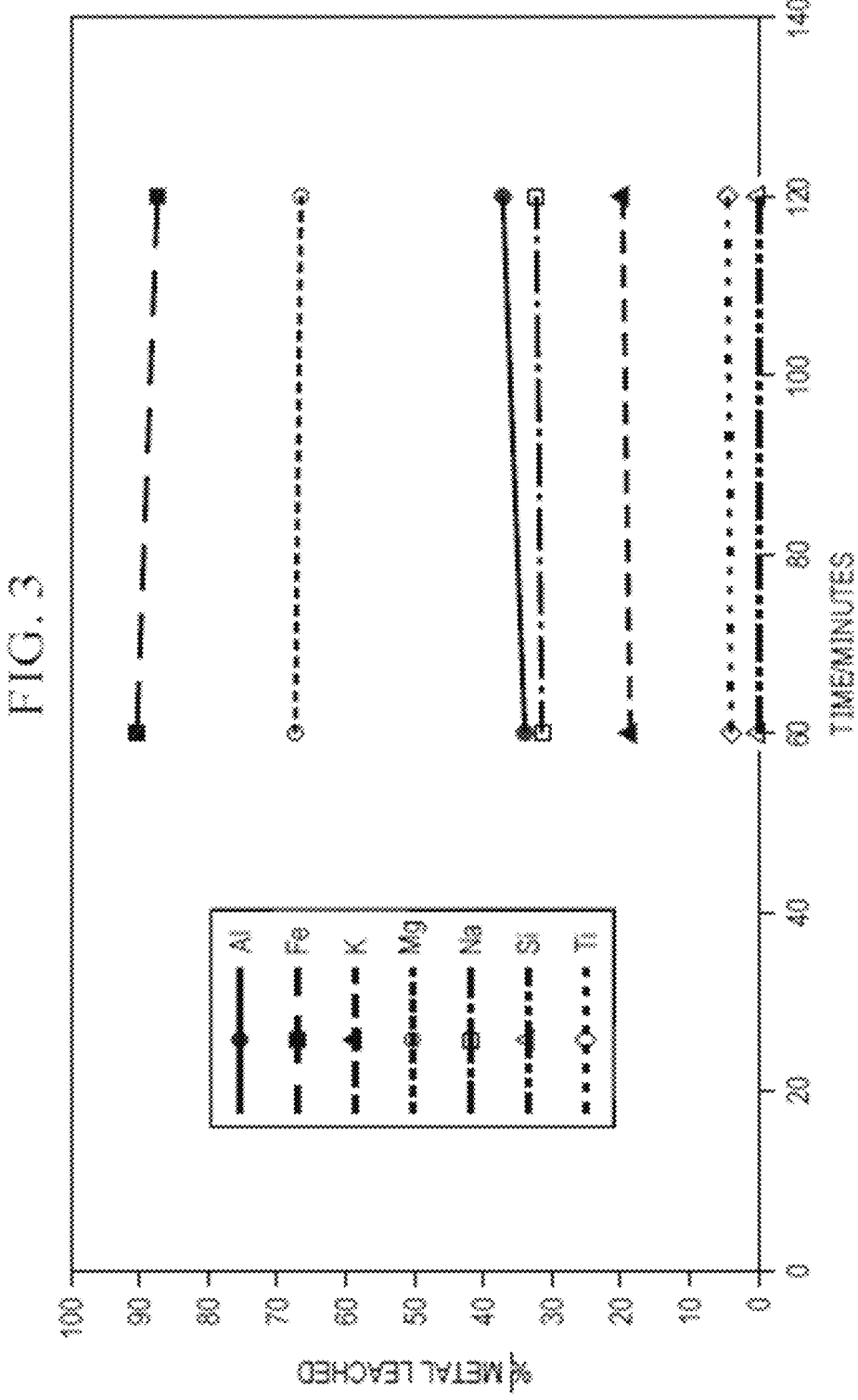

A solution of 32% HCl was heated to 80° C. and sufficient calcine added to give a slurry density of 40% solids (w/w). The extraction of major elements are shown in FIG. 3. The reaction appears to be essentially complete within the initial 60 minutes as there is little further change in concentrations up to 120 minutes.

Table 3 shows the solution concentrations after 120 min.

TABLE 3

| Analyte | ppm |
|---|---|
| Al | 25240 |
| Ca | 1360 |
| Fe | 30800 |
| K | 3820 |
| Mg | 4732 |
| Mn | 343 |
| Na | 1502 |
| Si | 68 |

The slurry from the leach test was filtered with the liquor moving forward to the sequential solvent extraction (SX) separation stages.

The liquor from the HCl leach was contacted with 10 vol % Alamine 336 dissolved in kerosene. The aqueous and organic phases were mixed and then allowed to separate. The organic phase was drained and then contacted with deionized water at a ratio 1:1 to strip several metal impurities off the organic phase. The organic phase was then remixed with the aqueous phase and subsequently separated and stripped with deionized water as previously described, this process being repeated a total of 10 times.

The extraction of metal impurities from the aqueous solution by the organic phase is shown in Table. The majority of Fe impurity is removed whilst little Al is lost. Some other metal impurities, Ba, Mn, S and Si are also extracted. Water stripping of the loaded organic very efficiently removed all elements.

TABLE 4

| Element | Al | Ca | Cr | Fe | K | Mg | Mn | Na | Si | Ti | V | Zn |
|---|---|---|---|---|---|---|---|---|---|---|---|---|
| Extraction (%) | 0.0 | 0.0 | 0.0 | 98.9 | 0.0 | 0.0 | 80.7 | 2.5 | 42.9 | 1.9 | 2.6 | 100.0 |

The separated aqueous solution from the initial loading (raffinate) has the assay shown in Table. This solution progresses into the Al—SX to upgrade and purify the aluminium concentration prior to precipitation.

TABLE 5

| Analyte | feed | raffinate |
|---|---|---|
| Al | 27,240 | 27,610 |
| Ca | 1,520 | 1,525 |
| Cr | 57 | 59 |
| Fe | 33,060 | 370 |
| K | 3,940 | 4,130 |
| Mg | 5,192 | 5,192 |

TABLE 5-continued

| Analyte | feed | raffinate |
|---|---|---|
| Mn | 394 | 76 |
| Na | 1,740 | 1,696 |
| Si | 7 | 4 |
| Ti | 160 | 157 |
| V | 39 | 38 |
| Zn | 79 | 0 |

The raffinate was mixed with an organic solution of 20 vol % D2 EHPA+10 vol % TBP to extract the aluminium. Table 6 shows the solution concentrations of the feed solution, the raffinate after Al extraction and the solution after contacting the loaded organic with sulphuric acid.

About 54% of the Al was extracted in the single stage of extraction. Without wishing to be bound by theory, this is thought to represent the maximum possible loading of the DEHPA with a further stage of extraction using fresh DEHPA being likely to increase this to >90%. The absence of analytical data for the Al—SX raffinate precludes any comment on the extraction of other elements. The sulphuric acid used in the strip was 200 g/L and this performed as anticipated by stripping the vast majority of the metal loaded onto the D2 EHPA.

TABLE 6

| Element | Feed | Raffinate | Strip |
|---|---|---|---|
| Al | 27,610 | 12666 | 6050 |
| Ca | 1525 | — | 5 |
| Cr | 59 | — | 0.5 |
| Fe | 370 | — | 114 |
| K | 4130 | — | 10 |
| Mg | 5192 | — | 22 |
| Mn | 76 | — | 2 |
| Na | 1696 | — | 26 |
| Si | 4 | — | 0.5 |
| Ti | 157 | — | 8 |
| V | 38.2 | — | 2.8 |
| Zn | 0.4 | — | 0.1 |

The data for Fe suggests that iron was more readily concentrated than Al. It is known that Fe is more strongly extracted than Al using D2 EHPA, thus Fe is going to load onto the D2 EHPA before Al, so a high fraction of the Fe will be extracted from the aqueous feed. Most importantly, the levels of Ca, K, Mg, Na, P, Ti and V are all significantly reduced in the strip solution.

The use of 200 g/L H$_2$SO$_4$ as the strip solution was to ensure complete stripping of the D2 EHPA. Without wishing to be bound by theory, there is good potential for selectively stripping Al from D2 EHPA whilst leaving Fe (and probably other elements) by more carefully controlling the pH of the strip solution. Scrubbing of the loaded organic with a high Al-concentration solution is also expected to further reduce impurity levels.

The strip solution from the Al SX runs was neutralised using NaOH to a final pH >6 in order to precipitate the Al. The concentrations of feed and filtrate are shown in Table along with the percentage of elements precipitated. As can be seen, the Al was completely precipitated whilst other elements were partially or not precipitated. The important elements are those which have high (i.e. >1 ppm) starting concentrations. The increases in Na and K in the filtrate were due to the NaOH and impurity K in the NaOH. As can be seen, the precipitation was extremely effective for many elements, other than Al, these elements were present at such low levels that they represent low quantities. The amount of Na precipitated is not clear since NaOH was used to raise the pH. Using ammonia to neutralise the solution eliminates addition of Na or K to the solution.

TABLE 7

| Element | ppm in feed | ppm in filtrate | % precipitated |
| --- | --- | --- | --- |
| Al | 6050 | 0.134 | 100 |
| Ca | 3.82 | 4.85 | 0.0 |
| Cr | 0.131 | 0.005 | 96.2 |
| Fe | 0.799 | 0.077 | 90.4 |
| K | 2.55 | 10.7 | 0.0 |
| Mg | 4.03 | 3.38 | 16.4 |
| Mn | 0.617 | 0.157 | 74.6 |
| Na | 72.13 | 11920 | 0.0 |
| Si | 0.723 | 0.704 | 3.0 |
| Ti | 10.2 | 0.0025 | 100 |
| V | 4.36 | 0.12 | 97.3 |
| Zn | 0.185 | 0.0065 | 96.5 |

The aluminium precipitate was dried and calcined at 1200° C. for 4 h to convert the precipitate to HPA. A portion of the HPA was subsequently washed in ultrapure water to remove any soluble surface ions.

Table shows the major impurities measured in the raw and washed HPA. Any element which was analysed at below its detection limit was taken to be at the detection limit. This is particularly important for S which has a very high detection limit of 10 ppm, in reality, it is probable that the actual level is somewhat lower. The major impurity elements were Si and Fe.

The HPA was washed using ultrapure water to remove any remaining soluble ions and the data shows that this stage is critical to achieve the required >99.99% purity. It should be noted that no loss of Al occurs during the washing stage.

TABLE 8

| Element | ppm raw | ppm washed |
| --- | --- | --- |
| Si | 84.6 | 22.0 |
| Fe | 26.3 | 15.0 |
| Na | 20.9 | 2.7 |
| K | 11.7 | 4.2 |
| Ca | 6.5 | 4.1 |
| S | 10 | 10 |
| Others | 13.3 | 9.6 |
| Total | 173.2 | 67.7 |
| Purity (%) | 99.983 | 99.993 |

Others includes a further 60 elements.

The water used to wash the HPA may be replaced by an acid solution which is expected to result in even higher removal of impurities without any loss of HPA.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

22

The invention claimed is:

1. A process for producing high purity alumina (HPA) from an aluminium-bearing material, the process comprising the steps of:
providing an aluminium-bearing solution of the aluminium-bearing material,
selectively extracting aluminium from the aluminium-bearing solution by liquid-liquid extraction or liquid-solid extraction to obtain an aluminium-enriched organic liquid or aluminium-enriched ion exchange resin;
scrubbing the aluminium-enriched organic liquid or aluminium-loaded ion exchange resin with an aqueous solution to remove one or more metal impurities therefrom, thereby producing a metal impurity-depleted aluminium-enriched organic liquid or metal impurity-depleted aluminium enriched ion exchange resin;
stripping aluminium from the metal impurity-depleted aluminium-enriched organic liquid or metal impurity-depleted aluminium-enriched ion exchange resin by contacting said liquid or said resin with an acidic aqueous solution and producing an aluminium-enriched aqueous solution;
precipitating and separating an aluminium precipitate from the aluminium-enriched aqueous solution; and,
calcining the separated aluminium precipitate to produce HPA.

2. The process according to claim 1, wherein the step of providing an aluminium-bearing solution of the aluminium-bearing material comprises leaching the aluminium-bearing material with an acid and separating the resulting aluminium-bearing solution from any remaining insoluble material.

3. The process according to claim 1, wherein the step of providing an aluminium-bearing solution of the aluminium-bearing material may comprise dissolving the aluminium-bearing material in water and separating the resulting aluminium-bearing solution from any remaining insoluble material.

4. The process according to claim 1, wherein the step of selectively extracting aluminium from the aluminium-bearing solution by liquid-liquid extraction comprises reacting the aluminium-bearing solution with an extractant having selectivity for aluminium ('the aluminium extractant').

5. The process according to claim 4, wherein the aluminium extractant comprises one or more organophosphorus compounds selected from an organic derivative of phosphoric acid, phosphonic acid, phosphinic acid or dithiophosphinic acid.

6. The process according to claim 4, wherein the extractant is present in an organic liquid phase which is immiscible with the aluminium-bearing solution whereby reacting the extractant with the aluminium-bearing solution transfers aluminium from the aluminium-bearing solution into the organic liquid phase to produce the aluminium-enriched organic liquid.

7. The process according to claim 1, wherein the step of selectively extracting aluminium from the aluminium-bearing solution by liquid-solid extraction comprises contacting the aluminium-bearing solution with an ion exchange resin having selectivity for aluminium over monovalent or divalent cations.

8. The process according to claim 7, wherein the ion exchange resin comprises a strong acid cation exchange resin or a weak acid cation exchange resin.

9. The process according to claim 1, wherein scrubbing the aluminium-enriched organic liquid comprises contacting the aluminium-enriched organic liquid with an aqueous scrub solution to transfer the minor metal impurities into the aqueous scrub solution, thereby producing an impurity-depleted aluminium-enriched organic liquid phase and an impurity-enriched aqueous phase.

10. The process according to claim 9, wherein the aqueous scrub solution comprises a dilute acid or an aqueous solution of aluminium that is substantially free of metal impurities.

11. The process according to claim 9, wherein the aqueous scrub solution comprises a bleed stream of the aluminium-enriched aqueous solution obtained by stripping the aluminium-loaded organic liquid.

12. The process according to claim 1, wherein the step of stripping the metal impurity-depleted aluminium-enriched organic liquid or metal impurity-depleted aluminium-enriched ion exchange resin comprises contacting said liquid or said resin with an acidic aqueous solution with a pH less than or equal to 3.

13. The process according to claim 1, wherein the step of precipitating an aluminium precipitate from the aluminium-enriched solution comprises increasing a pH of said solution to a range of 4-11.

14. The process according to claim 13, wherein increasing the pH of said solution comprises adding a aqueous ammonia, NH$_4$OH, to said solution.

15. The process according to claim 1, wherein the aluminium precipitate comprises a tetrahydroaluminate [Al(OH)$_4$]— compound, an aluminium oxyhydroxide, AlOOH, compound or an aluminium hydroxide Al(OH)$_3$ compound.

16. The process according to claim 1, wherein the precipitating step is performed at an elevated temperature and, optionally, at elevated pressure.

17. The process according to claim 16, wherein the precipitating step is maintained at the elevated temperature and, optionally, at the elevated pressure, for between 15 minutes and 48 hours.

18. The process according to claim 1, wherein the step of calcining the aluminium precipitate is performed at a temperature between 300° C. and 1400° C.

19. The process according to claim 1, wherein the step of calcining is performed in two stages, the first stage being at a first temperature and for a period of time sufficient to eliminate water of crystallisation from the aluminium precipitate and the second stage being at a higher temperature than the first temperature and for a period of time sufficient to convert the aluminium precipitate to corundum (α-Al$_2$O$_3$), β-alumina or alumina polymorphs selected from ρ-, η-, δ-, θ-, κ- and γ-alumina.

20. The process according to claim 1, wherein the process further comprises separating iron from the aluminium-bearing solution prior to selectively extracting aluminium from the aluminium-bearing solution.

21. The process according to claim 20, wherein said further step of separating iron impurities from the aluminium-bearing solution comprises selectively extracting the iron impurities by liquid-liquid extraction or liquid-solid extraction to obtain an iron-depleted aluminium-bearing solution.

22. The process according to claim 21, wherein the step of selectively extracting iron impurities from the aluminium-bearing solution by liquid-liquid extraction comprises reacting the aluminium-bearing solution with an iron extractant having selectivity for iron.

23. The process according to claim 22, wherein the iron extractant comprises a synergistic mixture of di(2-ethylhexyl) hydrogen phosphate and tributyl phosphate, or a primary amine in a free base form.

24. The process according to claim 21, wherein the step of selectively extracting iron impurities from the aluminium-bearing solution by liquid-solid extraction comprises contacting the aluminium-bearing solution with an ion exchange resin having selectivity for iron impurities.

25. The process according to claim 5, wherein the aluminium extractant further comprises a carboxylic acid, ketoxime or aldoxime compound.

* * * * *